(12) United States Patent
Anziano (10) Patent No.: US 10,743,562 B2
(45) Date of Patent: Aug. 18, 2020

(54) ICE-CREAM VENDING MACHINE

(71) Applicant: Maximilian M Anziano, Kentfield, CA (US)

(72) Inventor: Maximilian M Anziano, Kentfield, CA (US)

(*) Notice: Subject to any disclaimer, the term of this patent is extended or adjusted under 35 U.S.C. 154(b) by 285 days.

(21) Appl. No.: 15/732,535

(22) Filed: Nov. 27, 2017

(65) Prior Publication Data

US 2019/0159476 A1 May 30, 2019

(51) Int. Cl.

| | |
|---|---|
| *A23G 9/28* | (2006.01) |
| *G07F 9/10* | (2006.01) |
| *A23G 9/24* | (2006.01) |
| *G07F 17/00* | (2006.01) |
| *G07F 13/10* | (2006.01) |
| *A23G 9/22* | (2006.01) |
| *G07F 13/06* | (2006.01) |

(52) U.S. Cl.
CPC ............... *A23G 9/28* (2013.01); *A23G 9/22* (2013.01); *A23G 9/245* (2013.01); *A23G 9/283* (2013.01); *G07F 9/105* (2013.01); *G07F 13/065* (2013.01); *G07F 13/10* (2013.01); *G07F 17/0071* (2013.01)

(58) Field of Classification Search
CPC . A23G 9/28; A23G 9/285; A23G 9/24; A23G 9/245; G07F 17/0071; G07F 9/105
See application file for complete search history.

(56) References Cited

U.S. PATENT DOCUMENTS

| | | | | |
|---|---|---|---|---|
| 5,271,572 | A * | 12/1993 | Grandi | A23G 3/2023 241/199.12 |
| 6,308,522 | B1 * | 10/2001 | Jones | A23G 9/225 62/114 |
| 6,698,228 | B2 * | 3/2004 | Kateman | A23G 9/045 62/346 |
| 6,868,687 | B2 * | 3/2005 | de Koeijer | A23G 9/163 222/146.6 |
| 7,191,612 | B2 * | 3/2007 | Chirnomas | F25D 17/065 62/250 |
| 7,647,952 | B2 * | 1/2010 | Ciabatti | A23G 9/28 141/234 |
| 7,896,038 | B2 * | 3/2011 | Jones | A23G 9/22 141/103 |
| 8,509,947 | B2 * | 8/2013 | Jarisch | B25J 11/00 700/233 |

(Continued)

*Primary Examiner* — Michael McCullough
(74) *Attorney, Agent, or Firm* — Savantek Patent Services; Ivan E. Rozek (57) ABSTRACT

An ice-cream vending machine with an insulated and refrigerated bottom half housing containing stacks of pre-portioned ice-cream supported by a plurality of circular platforms and a top half housing containing radially deposed topping storage bins, a topping retrieval mechanism, a centrally located stacked cup storage tube and a centrally located cup holding platform. The topping retrieval mechanism with a topping receiving cup is attached to a horizontally disposed telescoping arm The telescoping arm engages a radially disposed drive mechanism that allows the topping receiving cup to access a selected bin and deliver the topping to a portion of ice-cream. The ice-cream portions are retrieved one at a time from the refrigerated bottom half housing and delivered via an ice-cream delivery mechanism to a centrally located ice-cream cup.

19 Claims, 9 Drawing Sheets

(56) References Cited

U.S. PATENT DOCUMENTS

| | | | | |
|---|---|---|---|---|
| 8,875,843 B2* | 11/2014 | Cihak | ...................... | E04H 5/08 |
| | | | | 186/38 |
| 8,989,893 B2* | 3/2015 | Jones | ...................... | A23G 9/22 |
| | | | | 700/234 |
| 9,635,874 B2* | 5/2017 | Bruckner | ............... | A23G 9/283 |
| 2007/0108221 A1* | 5/2007 | Mosey | ................... | G07F 11/00 |
| | | | | 221/150 R |
| 2014/0120235 A1* | 5/2014 | Jones | ...................... | A23G 9/28 |
| | | | | 426/565 |
| 2016/0242434 A1* | 8/2016 | Jones | ................. | G07F 17/0071 |

* cited by examiner

ICE-CREAM VENDING MACHINE

CROSS REFERENCE TO RELATED APPLICATIONS

Provisional Patent Application 62/495,956

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of automated dispensing/vending machines and more specifically to an ice-cream and ice-cream topping vending machine.

Automated machines for dispensing ice-cream and other frozen confectioneries are known in the art. For example, Chirnomas (U.S. Pat. No. 5,027,698) discloses an ice-cream vending machine wherein the machine dispenses pre-filled containers of ice-cream. Davis et al (United States Pat application 2004/0251270) describes an ice-cream dispensing machine for dispensing soft-serve ice-cream. Kateman et al (U.S. Pat. No. 7,052,728) describes a machine for vending single servings of different flavors, wherein selected flavorants are mixed into a base liquid prior to freezing. Jones et al (U.S. Pat. No. 7,896,038) discloses a confectionary vending machine that employs robotics to provide a customized frozen confection.

However, even though the above described devices deliver frozen confections in a somewhat custom manner, there are deficiencies in the prior technology. For example, in the Jones et al patent, an expensive robotic arm moves an ice-cream receiving cup to one of a variety of topping holding stations to have soft serve ice-cream delivered into the cup and then topping applied to the soft serve ice-cream. There is no ability to dispense standard ice-cream which tends to be harder and not suitable for dispensing through a tube. Second, there is no provision for applying the toppings in an evenly distributed manner within the cup. Third, the robotic arm is required to travel to each topping dispensing location. A simpler and more economical solution would be to have radially disposed toppings delivered to a centrally located ice-cream cup. Fourth, the frozen confectionary is stored in the top portion of the vending machine, requiring the entire top portion of the machine to be kept at freezing temperatures thereby incurring extra expense to maintain low temperature in an uninsulated environment, plus the likely event of excess moisture creating ice partials that attach to the transparent front surface which defeats the intended viewing experience of the user.

BRIEF SUMMARY OF THE INVENTION

The primary object of the invention is to provide a vending machine the dispenses a variety of single serve ice-cream as well as selected toppings that can be chosen to put on top of the ice-cream.

Another object of the invention is to provide an ice-cream vending machine that stores multiple stacked portions of ice-cream in the bottom insulated half of the vending machine and a plurality of topping storage containers in the top half of the vending machine.

Another object of the invention is to provide an ice-cream vending machine that includes a centrally located revolving ice-cream platform and a radially disposed topping delivery arm that can access topping portions located in the topping storage containers and deliver them in an evenly distributed manner to the ice-cream portion located in a cup on the revolving ice-cream platform.

A further object of the invention is to provide an ice-cream vending machine that includes a mechanism to pull down ice-cream cups one at a time from a centrally located stack and place them on the centrally located ice-cream platform.

Yet another object of the invention is to provide an ice-cream vending machine that includes a plurality of peristaltic pumps that deliver liquid toppings via a delivery hose to the top of the ice-cream portion.

A further object of the invention is to provide an ice-cream vending machine that allows the user the ability to view all actions including cup placement, ice-cream placement and topping placement.

Another object of the invention is to provide a relatively simple mechanism for delivering toppings to a centrally located cup.

A further object of the invention is to provide a plurality of separator sheets that separate one ice-cream portion from another, and the ability to remove the separator sheets and store then in a receptacle for disposal.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an ice-cream vending machine comprising: an insulated and refrigerated bottom half housing containing stacks of pre-portioned ice-cream supported by a plurality of circular platforms, a top half housing containing radially deposed topping storage bins, a topping retrieval mechanism, a centrally located stacked cup storage tube and a centrally located cup holding platform, said topping storage bins including bins for storing dry granulated items such as nuts or candy and additional bins for storing liquid items such as chocolate or caramel toppings, said granulated storage bins including an automated portion delivery mechanism, said liquid storage bins including a peristaltic pump and hose delivery mechanism, said topping retrieval mechanism comprising a topping receiving cup attached to a horizontally disposed telescoping arm, said telescoping arm including a vertically disposed support member slidably engaging a radially disposed drive mechanism that allows said topping receiving cup to access a selected bin portion delivery mechanism, said topping receiving cup capable of automatically turning upside-down to enable it to deliver its contents to the top of an ice-cream portion held within a cup located on said centrally located cup holding platform, said ice-cream portions capable of being retrieved one at a time from said refrigerated bottom half housing and delivered via an ice-cream delivery mechanism to said centrally located ice-cream cup, and said ice-cream cups capable of being pulled down one at a time by a cup retrieval mechanism and being placed on said centrally located cup holding platform where they can accept said ice-cream portions and said toppings.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
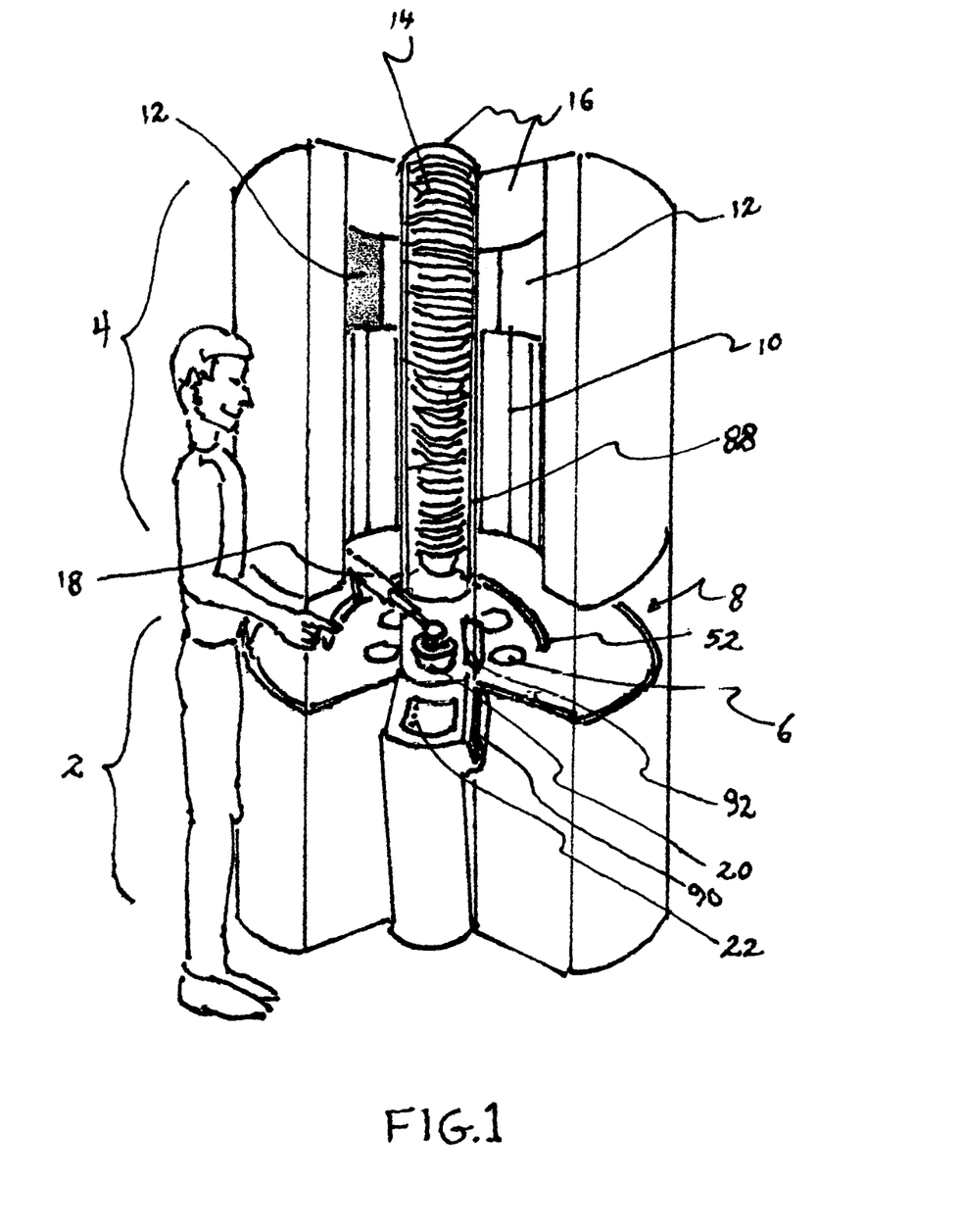
FIG. 1 is a perspective view of the invention.

Referring now to FIG. 1 we see a perspective view of the ice-cream vending machine of the present invention. The invention consists of an upper half 4 and a lower half 2. The lower half includes an insulated, refrigerated housing which stores stacks of ice-cream. The upper half stores granular toppings 10 in a plurality of radially disposed bins and liquid toppings 12 in an upper row of radially disposed containers. The upper half 4 can also be refrigerated to keep contents cool and fresh. The front surface of the housing 16, 8 is made of transparent material such as acrylic or glass so that the user can view both the toppings and the mechanism 18 that delivers the toppings. A microprocessor controlled panel 22 allows the user to select his or her choice of ice-cream and toppings. A credit card slot 90 allows the user to pay by credit card transaction, however other standard methods of payment may also be employed including smart phone applications that can remember the user's favorite ice-cream and topping combinations. A centrally located tube 88 stores stacked ice-cream cups 14. A cup is drawn down via telescoping suction cup 40, 44 shown in FIG. 2 and placed in a central location so that it is equally accessible to all toppings 10, 12. Topping delivery arm 18 travels in a radial path 52 and stops at each selected topping 10. The telescoping arm of the delivery mechanism delivers the topping to the ice-cream cup 20. The cup 20 revolves slowly so that the topping can be evenly distributed over the ice-cream contained within the cup 20. Each ice-cream portion is delivered from an opening 6 in the bottom half 2 cover plate. The entire housing is airtight thereby eliminating the chance of the entrance foreign objects such as dirt or insects. Door handle 92 allows the user to open a portion of the housing to retrieve his or her ice-cream and topping contained within ice-cream cup 20.

Figure 2:
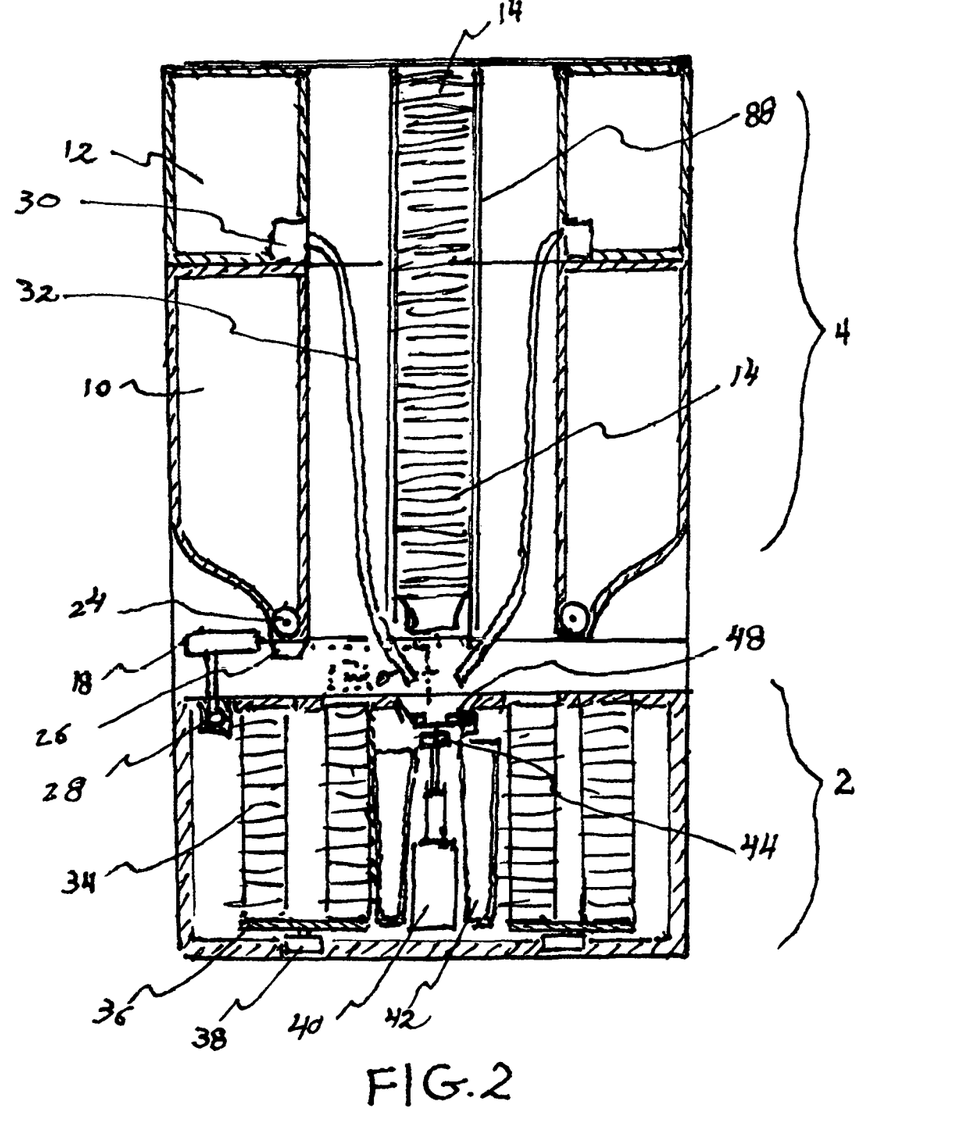
FIG. 2 is a section view of the invention.

FIG. 2 is a side section view which vertically bisects the invention. Upper housing half 4 includes granular storage bins 10 and liquid storage container 12. The granular material can be dispensed in a portioned amount by portion control mechanism 24, which drops a single portion into delivery cup 26. Telescoping arm 18 extends the cup 26 to the central ice-cream holding area and delivers it to the top of the ice-cream located at the epicenter of the unit. Liquid toppings 12 are pumped to the delivery area via a peristaltic pump 30 and delivery tube 32 to the area just above cup 20. Ice-cream cups 14 are stacked in tube 88. The lower most cup can be pulled down when a suction cup 44 on telescoping arm 40 attaches to the bottom of the cup to draw it down to sit on top of round plate 48. Round plate 48 is capable of rotating so that when a topping is dispensed, it is evenly distributed over the ice-cream. The lower housing 2 contains stacks of ice-cream 34. The ice-cream 34 is segmented into portions so that they can be delivered one at a time. Platforms 36 are motorized 38 to allow any one of the stacks to rotate into place for use. The upper housing half 4 preferably is refrigerated to keep the topping ingredients cool and fresh.

Figure 3:
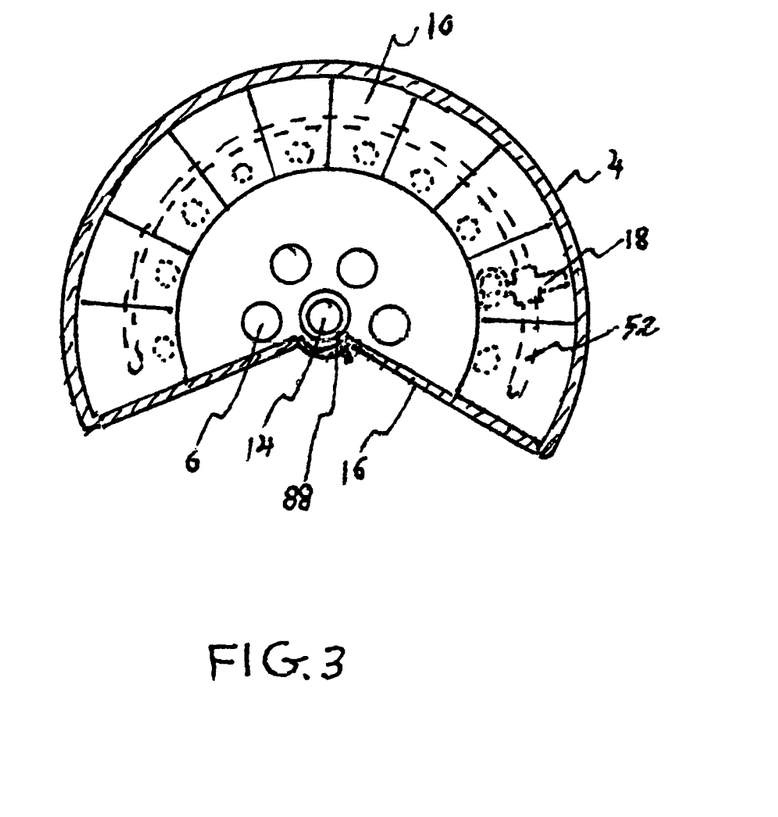
FIG. 3 is a top view of the top half of the invention.

FIG. 3 is a sectioned top view of the top half 4 of the housing. Radially disposed bins 10 can be seen as well as the radial track 52 shown in dotted lines that allows the delivery arm 18 to access all bins. Apertures 6 allow ice-cream portions 34 to be accessed from the bottom half 2 of the housing. Central cup holder tube 88 holds stacked cups 14.

Figure 4:
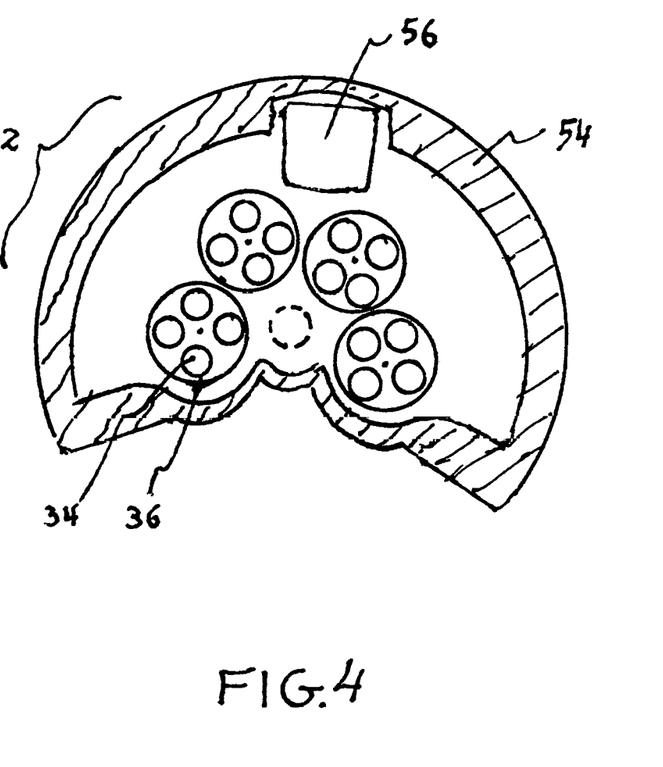
FIG. 4 is a top view of the bottom half of the invention.

FIG. 4 is a sectioned view of the lower half 2 of the housing. The entire lower half is insulated 54 thereby allowing freezing air generated by compressor and coil unit 56 to stay cool efficiently. Four ice-cream holding platforms 36 can be seen, each holding four stacks of ice-cream 34. Each platform is capable of rotating so that one of the four stacks of ice-cream 34 can be accessed through apertures 6.

Figure 5:
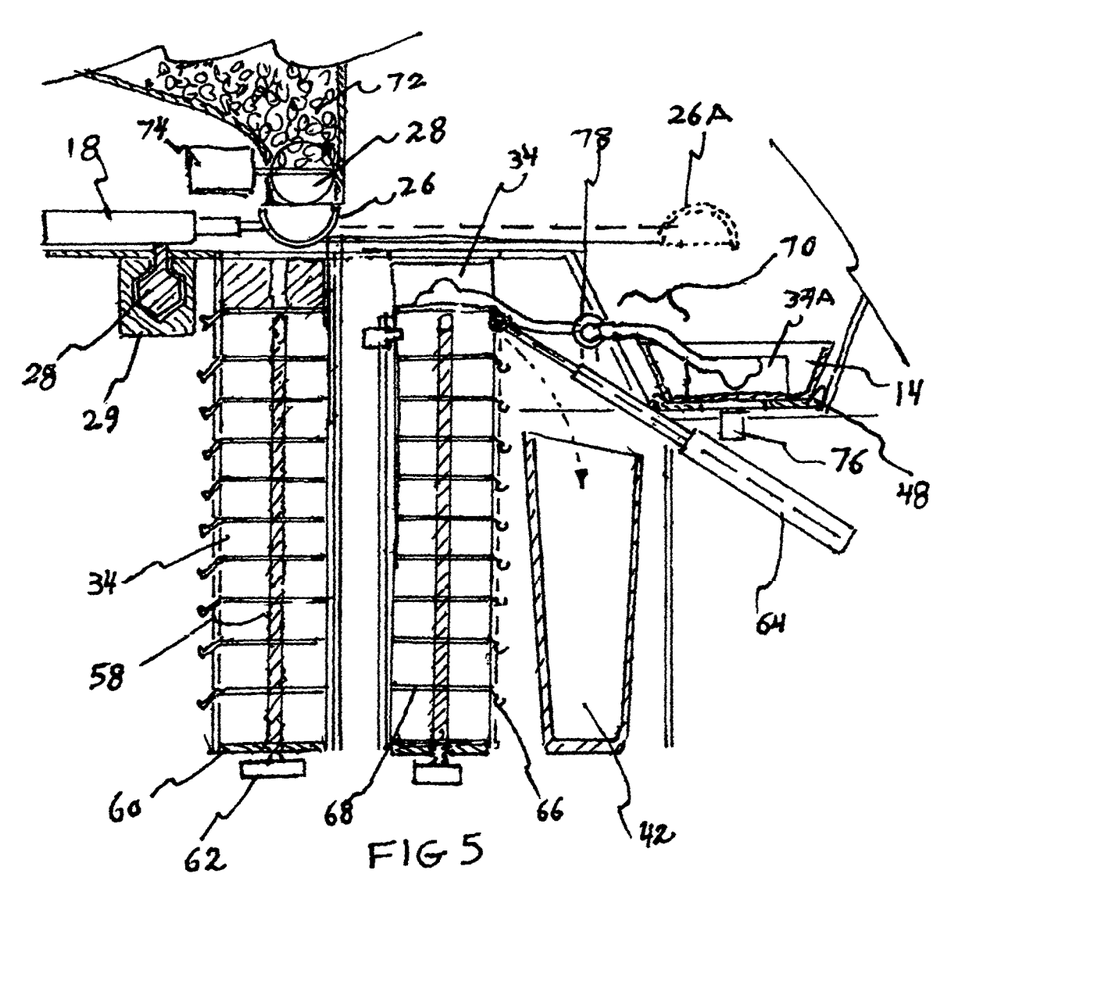
FIG. 5 is a partial detailed section view of the invention.

FIG. 5 is a partial section view of the interior workings of the lower housing 2 and the upper housing 4. Each ice-cream portion 34 includes a centrally located aperture to allow a lead screw 58 to reside through all the portions 34. A motor 62 drives the lead screw 58 causing bottom plate 60 to rise. When one portion 34 of ice-cream rises above aperture 6 the plate 60 stops allowing the ice-cream transfer mechanism 70 to grab the ice-cream portion 34 and place it 34A in cup 14. Partition panels 68 separate each ice-cream portion 34. Telescoping arm 64 engages a hook portion 66 on partition panel 68 and pulls it away from the stack, allowing it to fall into receptacle 42. cup support panel 48 is caused to rotate via gear motor 76 insuring that the toppings are sprinkled evenly over the ice-cream 34A. In the top half, telescoping delivery arm 18 can be seen with its cup 26 ready to accept granular material 72 as it is dispensed in a portioned fashion via portion control mechanism 28 powered by gear motor 74. The delivery cup 26A shown in dotted lines has been flipped upside down to sprinkle its contents into cup 14 and ice-cream 34A. The telescoping arm 18 can travel in a radial track 29 via vertical support member 28.

The cylindrical open space in the center of the ice-cream portion 34 also allows toppings to enter the space so that the topping is more evenly distributed throughout the final ice-cream and topping product. Additional depressions may also be molded into the top of the ice-cream portion 34 to further increase the even distribution of toppings.

Figure 6:
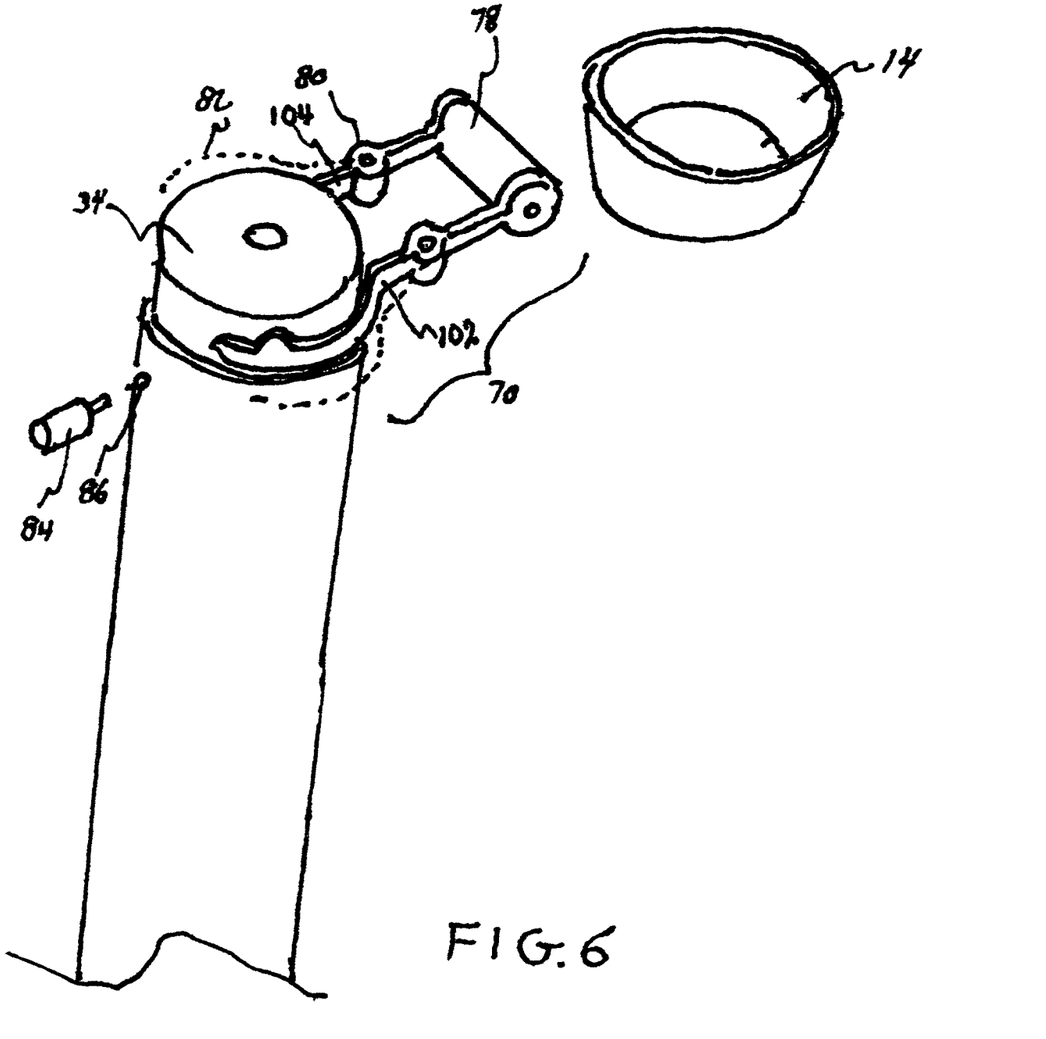
FIG. 6 is a perspective view of the ice-cream delivery portion of the invention in the start position.
Figure 7:
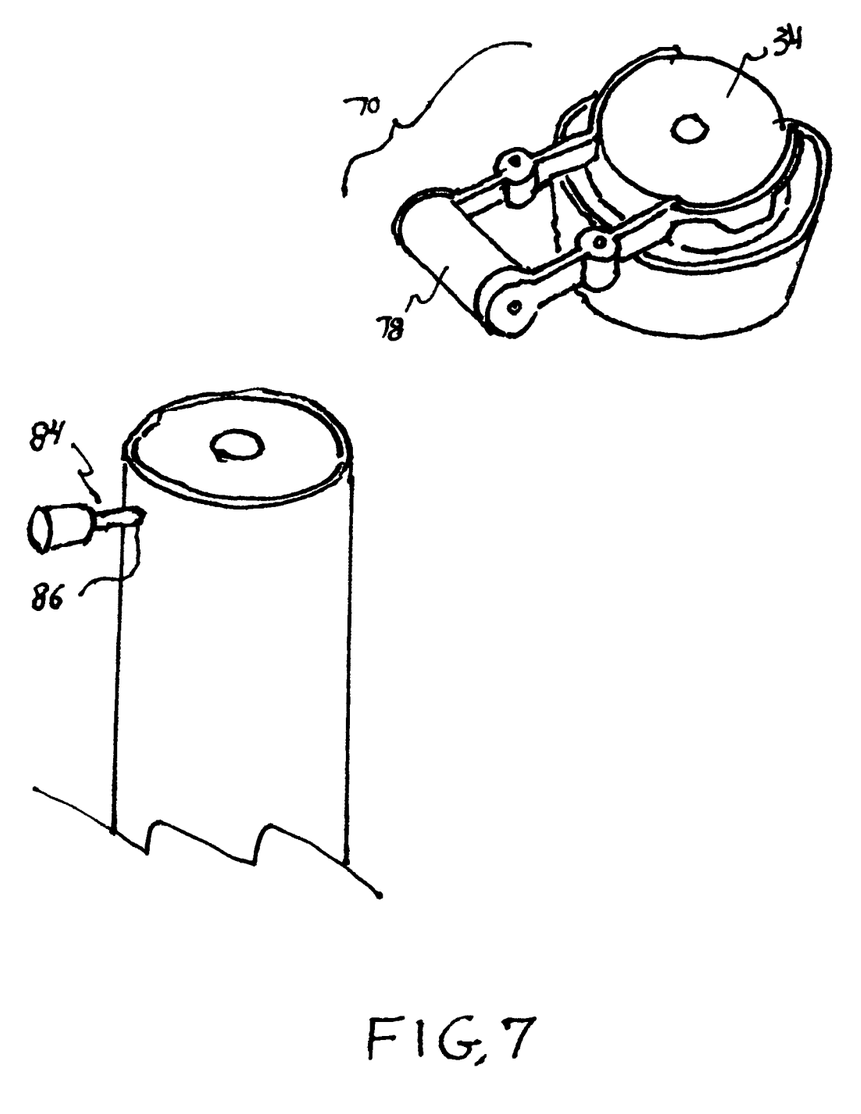
FIG. 7 is a perspective view of the ice-cream delivery portion of the invention in the finish position.

FIG. 6 is a perspective view of the ice-cream delivery mechanism 70. A pair of arms 102, 104 grip the ice-cream portion 34. The arms 102, 104 start in an outward position as shown by dotted lines 82 and then rotate inward via motorized joints 80 to firmly grip the ice-cream 34. A gear motor 78 then picks up the ice-cream portion 34 and delivers it into cup 14 as shown in FIG. 7. To ensure that the ice-cream portion below the one selected is not accidentally lifted, a solenoid shaft 84 enters aperture 86, as shown in FIG. 7 and penetrates the lower ice-cream portion, thereby insuring that it is not accidentally lifted.

In an alternate embodiment, the ice-cream stacks are continuous columns of ice-cream, and the ice-cream delivery system includes a heated spatula that slides into the side of the column at the location of a single portion, and then lifts the portion and delivers it into cup 14.

It should be noted that the ice-cream delivery system can deliver multiple portions of ice-cream 34 into cup 14 depending on what the user selects.

Figure 8:
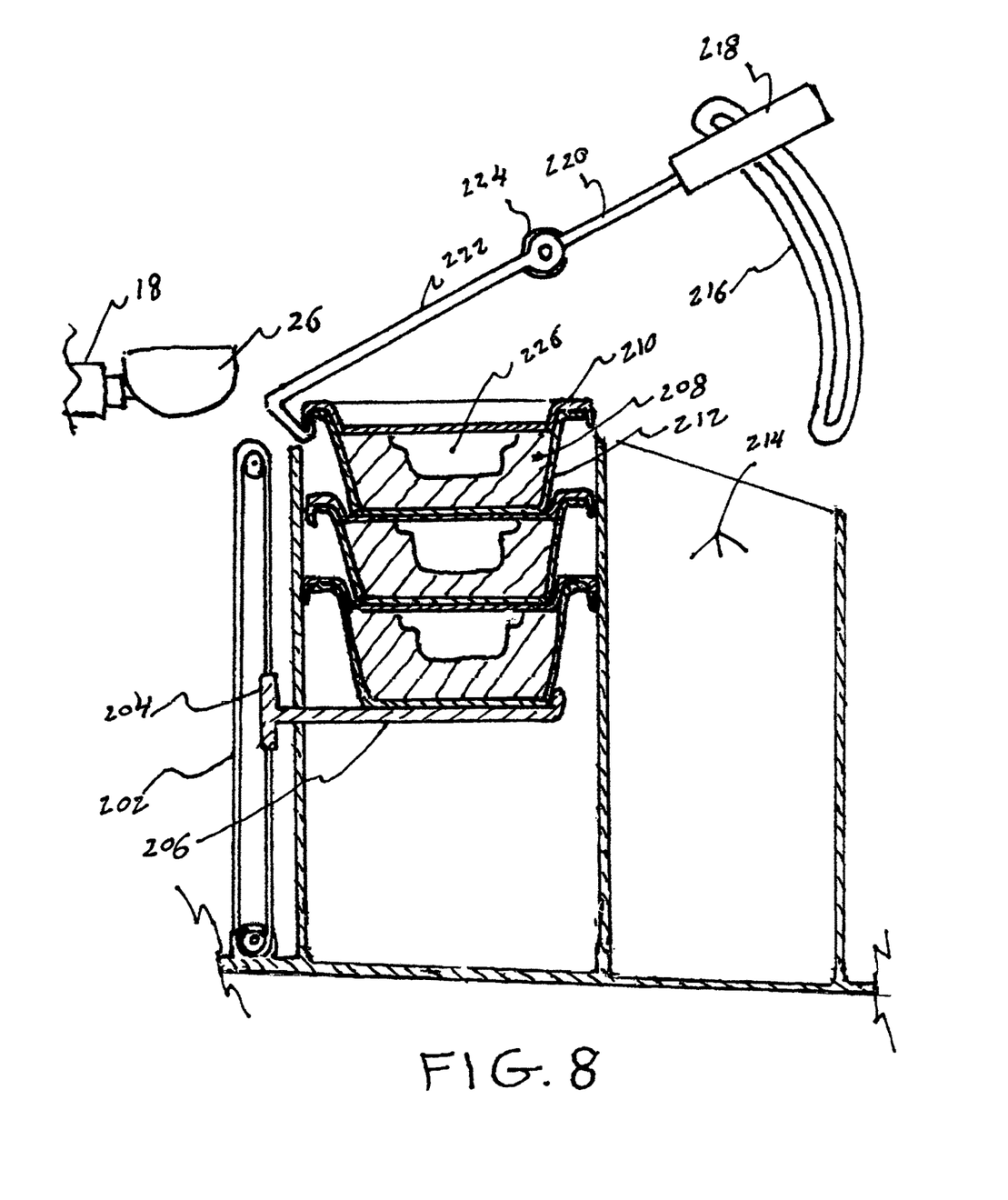
FIG. 8 is a partial section view of a second embodiment of the invention with lid about to be lifted.

FIG. 8 is a partial section view of a second embodiment of the invention. In this embodiment the portions of ice cream 208 are retained in cups 212 and include lids 210. The cups 212 are stacked on top of each other and are lifted by motorized lifting plate 206 which rises via motorized timing belt assembly 202, 204. The ice cream portions 208 include cavities 226 that can retain ice cream toppings delivered by scoop 26 and extension arm 18 as described in the first embodiment of the invention.

Figure 9:
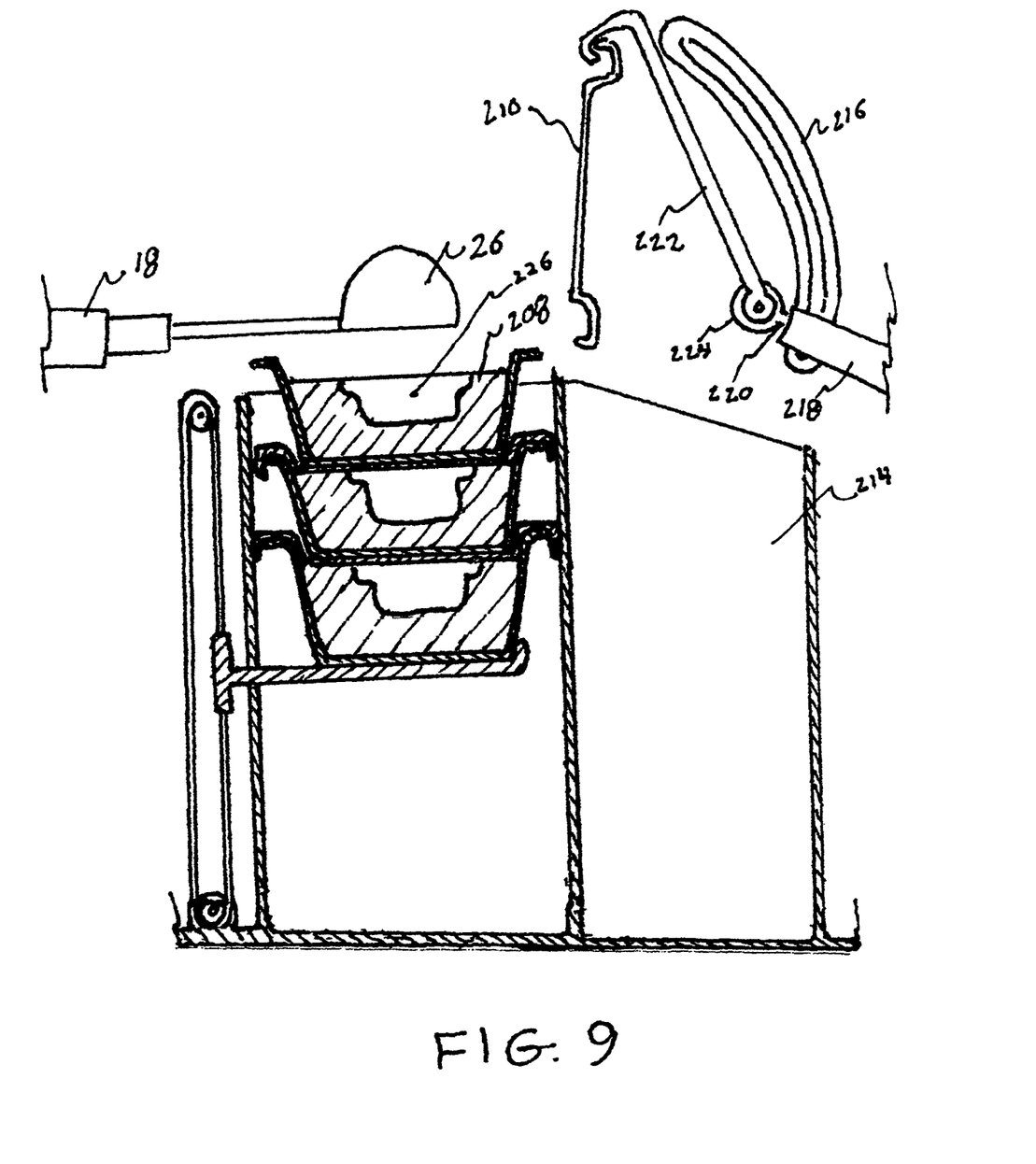
FIG. 9 is a partial section view of a second embodiment of the invention with the lid lifted.

Lifting arm 222 engages the return portion of lid 210 and can lift the lid by retracting piston arm 220 and rotating arm joint 224 as shown in FIG. 9. This allows the lid to be dropped into receptacle 214 for future disposal or recycling. This second embodiment eliminates the need to physically transport the ice cream portion from its stacked condition into an empty cup.

In another embodiment of the invention—multiple ice cream dispensing assemblies as described above are placed in line and mounted in a mobile food truck type vehicle so that people can have access to the present invention and to the ice-cream it serves in a variety of locations around town. Because the invention provides automatic delivery of ice-cream, multiple users can have access to ice-cream at the same time.

The invention provides an entertaining and exciting way for a person to access to ice-cream and toppings of his or her choice without need of human assistance.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An ice-cream vending machine comprising:
an insulated and refrigerated bottom half housing containing stacks of pre-portioned ice-cream supported by a plurality of circular platforms;
a top half housing containing radially disposed topping storage bins, a topping retrieval mechanism, a centrally located stacked cup storage tube and a centrally located cup holding platform;
said topping storage bins comprising bins for storing dry granulated toppings and bins for storing liquid toppings;
said granulated storage bins comprising an automated portion delivery mechanism;
said liquid storage bins comprising a peristaltic pump and hose delivery mechanism;
said topping retrieval mechanism comprising a topping receiving cup attached to a horizontally disposed telescoping arm;
said telescoping arm including a vertically disposed support member slidably engaging a radially disposed drive mechanism that allows said topping receiving cup to access a selected bin portion delivery mechanism;
said topping receiving cup capable of automatically turning upside-down to enable it to deliver its contents to the top of an ice-cream portion held within a cup located on said centrally located cup holding platform;
said ice-cream portions capable of being retrieved one at a time from said refrigerated bottom half housing and delivered via an ice-cream delivery mechanism to said centrally located ice-cream cup; and
said ice-cream cups capable of being pulled down one at a time by a cup retrieval mechanism and being placed on said centrally located cup holding platform where they can accept said ice-cream portions and said toppings.

2. An ice-cream vending machine as claimed in claim 1 further comprising a microprocessor based user interface enabling a user to select his or her ice-cream choice and topping choices.

3. An ice-cream vending machine as claimed in claim 1 further comprising a user payment system to pay for said ice-cream and said toppings using payment methods.

4. An ice-cream vending machine as claimed in claim 1 wherein said storage bins include closure lids that can be removed for refilling.

5. An ice-cream vending machine as claimed in claim 1 wherein said ice-cream portion delivery mechanism includes an automated arm that lifts said ice-cream portion from said stack and via an articulated mechanism delivers it into said ice-cream cup.

6. An ice-cream vending machine as claimed in claim 1 wherein said ice-cream portions include a central aperture enabling said ice-cream portions to be stacked on a central threaded pole.

7. An ice-cream vending machine as claimed in claim 1 wherein said ice-cream delivery mechanism also includes a centrally threaded motorized support disk capable of lifting said ice-cream stack one portion at a time for delivery to said ice-cream cup.

8. An ice-cream vending machine as claimed in claim 7 wherein a hole needed in said ice-cream portion for allowance of a lead screw also acts as a receiving orifice for ice-cream toppings.

9. An ice-cream vending machine as claimed in claim 1 wherein said stacked ice-cream portions are each separated by a separator sheet.

10. An ice-cream vending machine as claimed in claim 9 wherein each said separator sheet includes a flange capable of being pulled by a telescoping arm mechanism which can pull said separator sheet away from said stack and drop into a receptacle.

11. An ice-cream vending machine as claimed in claim 1 wherein said radially disposed topping bins are made of transparent material allowing a user to view the contents of said bins.

12. An ice-cream vending machine as claimed in claim 1 wherein said top half housing includes a transparent front portion allowing a user to view the activity of all said actions related to the delivery of said ice-cream cups and said ice-cream and said toppings.

13. An ice-cream vending machine as claimed in claim 1 wherein a heated spatula creates a segmented portion of ice-cream instead of the pre-portioned stacked ice-cream.

14. An ice-cream vending machine comprising:
an insulated and refrigerated bottom half housing containing stacks of cups containing ice-cream portions wherein the cups are supported by a plurality of circular platforms;

a top half housing containing radially disposed topping storage bins, a topping retrieval mechanism and a centrally located cup holding mechanism and a centrally located cup holding platform;

said topping storage bins comprising bins for storing dry granulated toppings and bins for storing liquid toppings;

said granulated storage bins comprising an automated portion delivery mechanism;

said liquid storage bins comprising a peristaltic pump and hose delivery mechanism;

said topping retrieval mechanism comprising a topping receiving cup attached to a horizontally disposed telescoping arm;

said telescoping arm including a vertically disposed support member slidably engaging a radially disposed drive mechanism that allows said topping receiving cup to access a selected bin portion delivery mechanism;

said topping receiving cup capable of automatically turning upside-down to enable it to deliver its contents to the top of an ice-cream portion held within a cup located on said centrally located cup holding platform;

said ice-cream portions capable of being retrieved one at a time from said refrigerated bottom half housing and delivered via an ice-cream delivery mechanism to said centrally located ice-cream cup; and said ice-cream cups capable of being pulled down one at a time by a cup retrieval mechanism and being placed on said centrally located cup holding platform where they can accept said ice-cream cups and said toppings.

15. An ice-cream vending machine as claimed in claim 14 further comprising a microprocessor based user interface enabling a user to select his or her ice-cream choice and topping choices.

16. An ice-cream vending machine as claimed in claim 14 further comprising a user payment system to pay for said ice-cream and said toppings using payment methods.

17. An ice-cream vending machine as claimed in claim 14 wherein said storage bins include closure lids that can be removed for refilling.

18. An ice-cream vending machine as claimed in claim 14 wherein said radially disposed topping bins are made of transparent material allowing a user to view the contents of said bins.

19. An ice-cream vending machine as claimed in claim 14 wherein said top half housing includes a transparent front portion allowing a user to view the activity of all said actions related to the delivery of said ice-cream cups and said ice-cream and said toppings.

* * * * *